(12) United States Patent
Hanano

(10) Patent No.: US 6,598,870 B2
(45) Date of Patent: Jul. 29, 2003

(54) DOCUMENT CONVEYING APPARATUS AND IMAGE-FORMING MACHINE

(75) Inventor: Susumu Hanano, Osaka (JP)

(73) Assignee: Kyocera Mita Corporation, Osaka (JP)

(*) Notice: Subject to any disclaimer, the term of this patent is extended or adjusted under 35 U.S.C. 154(b) by 71 days.

(21) Appl. No.: 09/840,968

(22) Filed: Apr. 25, 2001

(65) Prior Publication Data

US 2002/0008352 A1 Jan. 24, 2002

(30) Foreign Application Priority Data

Apr. 28, 2000 (JP) ........................................ 2000-130723
Mar. 21, 2001 (JP) ........................................ 2001-080488

(51) Int. Cl.[7] ............................................... B65H 3/52
(52) U.S. Cl. ...................... 271/138; 271/9.09; 271/245; 271/246; 271/273; 271/274
(58) Field of Search ............................... 271/9.09, 245, 271/273, 274, 138, 246

(56) References Cited

U.S. PATENT DOCUMENTS 4,849,788 A * 7/1989 Prebola ..................... 271/3.14
5,077,614 A * 12/1991 Stemmle et al. ............ 271/245

FOREIGN PATENT DOCUMENTS

JP 404350047 A1 * 12/1992

* cited by examiner

Primary Examiner—Eileen D. Lillis
Assistant Examiner—Michael Lowe
(74) Attorney, Agent, or Firm—Smith, Gambrell & Russell, LLP

(57) ABSTRACT

A document conveying apparatus comprising a document conveying passage and a pair of document introduction rollers disposed at a document insertion portion, and a copier equipped with the document conveying apparatus. A cover frame is pivotably supported by the support frame body of the document conveying apparatus. A shutter member is supported by the support frame body so as to move up and down between a shut-off position and an open position. The cover frame and the shutter member are interlocked to each other so that the shutter member is moved up to the open position when the cover frame is turned to the closed position and the shutter member is moved down to the shut-off position when the cover frame is turned to the open position.

6 Claims, 12 Drawing Sheets

DOCUMENT CONVEYING APPARATUS AND IMAGE-FORMING MACHINE

FIELD OF THE INVENTION

The present invention relates to a document conveying apparatus and, more concretely, to a document conveying apparatus of the type in which a document is inserted by hand into a document conveying passage. The invention further relates to an image-forming machine equipped with the above document conveying apparatus, such as an image-forming machine which is an electrostatic copier.

DESCRIPTION OF THE PRIOR ART

An electrostatic copier capable of copying documents of large sizes such as documents of, for example, JIS A0-size, is equipped at its upper end portion with a document conveying apparatus. The document conveying apparatus includes a document conveying passage which is so arranged as to extend nearly horizontally and a pair of rollers for introducing document which is disposed at a document insertion portion in the document conveying passage. A document table is disposed on the upstream side of the document insertion portion. On the downstream side of the pair of document introduction rollers in the document conveying passage, there are arranged a document holder roller and a pair of discharge rollers in this order from the upstream toward the downstream. The pair of document introduction rollers and the pair of discharge rollers are constituted by driven rollers and follower rollers, and the document holder roller is constituted by a follower roller. A support frame is supported at an upper end of the copier body so as to pivot on a turn shaft between an open position where the support frame permits at least part of a region of the upper surface portion of the copier body to be exposed upward and a closed position where the support frame covers the region of the upper surface portion of the copier body. The driven rollers of the pair of document introduction rollers and of the pair of discharge rollers are rotatably disposed at upper end portions of the copier body. The follower rollers of the pair of document introduction rollers and of the pair of discharge rollers as well as the document holder roller are rotatably disposed in the support frame.

The driven roller of the pair of document introduction rollers is drive-coupled to an electric motor provided in the copier body through a power transmission mechanism inclusive of an electromagnetic clutch. The driven roller of the pair of discharge rollers is drive-coupled to the above electric motor though a power transmission mechanism. The document holder roller is drive-coupled to the follower roller of the pair of discharge rollers through a pulley and a belt. A document-reading position is provided on the document conveying passage, and a glass having a horizontal upper surface is disposed at the document-reading position. The glass is disposed at an upper end of the copier body. When the support frame is brought to the closing position, the follower rollers of the pair of document introduction rollers and of the pair of discharge rollers are brought into pressed contact with the corresponding driven rollers provided in the copier body, and the document holder roller is brought into pressed contact with the upper surface of the glass. A close-contact type image sensor including a source of light is disposed under the glass in the copier body. An inserted document detector switch is disposed right on the upstream side of the pair of document introduction rollers in the document conveying passage. A trailing end detector switch is disposed right on the downstream side of the pair of document introduction rollers to detect the trailing end of the document.

The inserted document detector switch is turned on when a document is inserted by hand through the document insertion portion and its leading end is inserted in a nip portion of the pair of document introduction rollers and is positioned. After a lapse of a predetermined period of time from when the inserted document detector switch is turned on, the electromagnetic clutch is turned on and, then, the electric motor is actuated to rotatively drive the pair of document introduction rollers, the document holder roller and the pair of discharge rollers. The document is conveyed passing through the document conveying passage by the pair of document introduction rollers, the document holder roller and the pair of discharge rollers, and is discharged by the pair of discharge rollers from the document conveying passage. When the trailing end of the document passes over the trailing end detector switch and the detector switch is caused to be turned off, the electromagnetic clutch is turned off and the pair of document introduction rollers cease to rotate. After a lapse of a predetermined period of time from when the trailing end detector switch is turned off, the electric motor is brought into a halt, and the document holder roller and the pair of discharge rollers cease to rotate. The image of the document conveyed by the document conveying apparatus as described above is, then, read by the close-contact type image sensor as it passes through the image-reading position disposed on the way of the document conveying passage. The image read by the sensor is sent to the image-forming portion of the copier and is turned into a toner image. The toner image is transferred and fixed on a paper conveyed from a paper-holding portion disposed in the copier.

In order to copy the document by using the above-mentioned conventional document conveying apparatus, the user, first, inserts the document through the document insertion portion, inserts the leading end of the document by hand into a nip portion of the pair of document introduction rollers to position the document in the direction of conveyance and, further, positions the leading end of the document at right angles with the direction of conveyance to prevent the paper from being fed aslant. In practical cases, however, the leading end of the document tends to become aslant at a moment when the leading end of the document is nipped by the pair of document introduction rollers that are rotatively driven, making it difficult to reliably prevent the document from being fed aslant and, hence, causing the document to be damaged. The reason is because a gap on the upstream side of the nip portion of the pair of document introduction rollers is formed to be gradually decreases toward the nip portion between the outer peripheral surfaces of the driven rollers and the outer peripheral surfaces of the follower rollers, and it is, therefore, relatively difficult for the user to insert by hand the leading end of the document uniformly along the nip portion of the pair of document introduction rollers over the whole region in the direction of width thereof to position the document. In particular, it becomes more difficult to correctly position the document as the size of the document increases. In the image-forming machine which is equipped with the above-mentioned document conveying apparatus and which reads the image of the document conveyed by the document conveying apparatus to record the image onto the paper, further, it is likely that the recording of image is not smoothly executed as desired, and the recording efficiency decreases. Therefore, it has been desired to improve the document conveying apparatus.

SUMMARY OF THE INVENTION

It is an object of the present invention to provide a novel document conveying apparatus which facilitates the manual operation for correctly positioning the leading end of the document to be at right angles with the direction of conveyance and consequently, can reliably prevent the document from being fed aslant to reliably prevent the document from being damaged.

It is another object of the present invention to provide a novel document conveying apparatus which facilitates the manual operation for correctly positioning the leading end of the document to be at right angles with the direction of conveyance even when the document has a large size and consequently, can reliably prevent the document from being fed aslant to reliably prevent the document from being damaged.

It is a further object of the present invention to provide a novel image-forming machine which guarantees the execution of a smooth recording of image as desired with a high image-forming efficiency as a result of the provision of a document conveying apparatus which facilitates the manual operation for correctly positioning the leading end of the document to be at right angles with the direction of conveyance and as a result, can reliably prevent the document from being fed aslant to reliably prevent the document from being damaged.

It is a still further object of the present invention to provide a novel image-forming machine which guarantees the execution of a smooth recording of image as desired with a high image-forming efficiency as a result of the provision of a document conveying apparatus which facilitates the manual operation for correctly positioning the leading end of the document to be at right angles with the direction of conveyance even when the document has a large size and as a result, can reliably prevent the document from being fed aslant to reliably prevent the document from being damaged.

According to one aspect of the present invention, there is provided a document conveying apparatus comprising a document conveying passage and a pair of document introduction rollers disposed at a document insertion portion on said document conveying passage, wherein:

said document conveying apparatus further comprising a support frame body disposed on the upper side of said document conveying passage and a cover frame supported pivotably by said support frame body;

said pair of document introduction rollers are constituted by a driven roller disposed on the lower side of said document conveying passage and a follower roller supported by said cover frame, said cover frame is allowed to turn selectively between a closed position where said follower roller is brought into pressed contact with said driven roller and an open position where said follower roller is located at an upper position away from said driven roller, a shutter member is supported on the downstream side of said pair of document introduction rollers to freely move up and down between a shut-off position where said shutter member shuts off said document conveying passage so that the leading end of a document inserted in said document conveying passage from said document insertion portion comes in contact therewith and is positioned and an open position where said shutter member retracts upward from said document conveying passage to permit the movement of said document, and said cover frame and said shutter member are interlocked to each other so that said shutter member is moved up to said open position when said cover frame is turned to the closed position and that said shutter member is moved down to said shut-off position when said cover frame is turned to the open position.

It is desired that a cam means capable of moving up and down said shutter member is disposed in said cover frame, an elastic member is disposed between said support frame body and said shutter member to urge said shutter member toward the open position and when said cover frame is brought to said open position, said shutter member is brought to the shut-off position by the action of said cam means against the resilient member and when said cover frame is brought to the closed position, said shutter member is brought to the open position by said elastic member as it is no longer acted by said cam means.

It is desired that said cam means is constituted by a leaf spring member having an arcuate cam surface, said shutter member has a to-be-depressed surface formed thereon, when said cover frame is turned to the open position, the cam surface of said leaf spring member is brought to an acting position where it depresses the to-be-depressed surface of said shutter member to move said shutter member down to the shut-off position against the elastic member and, when the cover frame is turned to the closed position, the cam surface of said leaf spring member is brought to a non-acting position where it substantially releases a depressing pressure to the to-be-depressed surface of said shutter member, permitting said shutter member to move up to the open position by said elastic member.

It is desired that said cover frame is rotatably supported by the support frame body via a turn shaft and, when said cover frame is turned to the open position, said leaf spring member brought to the acting position forcibly turns said cover member on the turn shaft to hold it at the open position.

It is desired that said shutter member is supported by said support frame body so as to be moved down to the shut-off position from the open position due to its own weight and to be moved up to the open position from the shut-off position against its own weight, an acting protuberance is disposed on said cover frame to move said shutter member up and down with the turn of said cover frame, a to-be-acted surface is formed on said shutter member, said to-be-acted surface of said shutter member is disposed on a locus of turn of the acting protuberance of said cover frame and when said cover frame is turned to the closed position, said acting protuberance is brought into contact with said to-be-acted surface of said shutter member from the lower side to move said shutter member up to the open position against its own weight and when said cover frame is turned to the open position, said acting protuberance moves in a direction to separate away downwardly from the to-be-acted surface of said shutter member, permitting said shutter member to move down to the shut-off position due to its own weight.

It is further desired that provision is made of an inserted document detector means disposed in the document insertion portion to detect the document that is inserted, an open/close position detector means disposed in the support frame body to detect the open position and the closed position of the cover frame, and a control means which, when the document is inserted in the document insertion portion and the cover frame is brought to the closed position, rotatively drives the pair of document introduction rollers in response to detection signals from said inserted document detector means and said open/close position detector means.

According to another aspect of the invention, there is provided an image-forming machine equipped with a document conveying apparatus of claim 1, for reading the image of a document conveyed by the document conveying apparatus and recording it onto a paper.

DETAILED DESCRIPTION OF THE PREFERRED EMBODIMENTS

A preferred embodiment of a document conveying apparatus constituted according to the present invention and of an electrostatic copier which is an image-forming machine provided with the document conveying apparatus will now be described in further detail with reference to the accompanying drawings.

Figure 1:
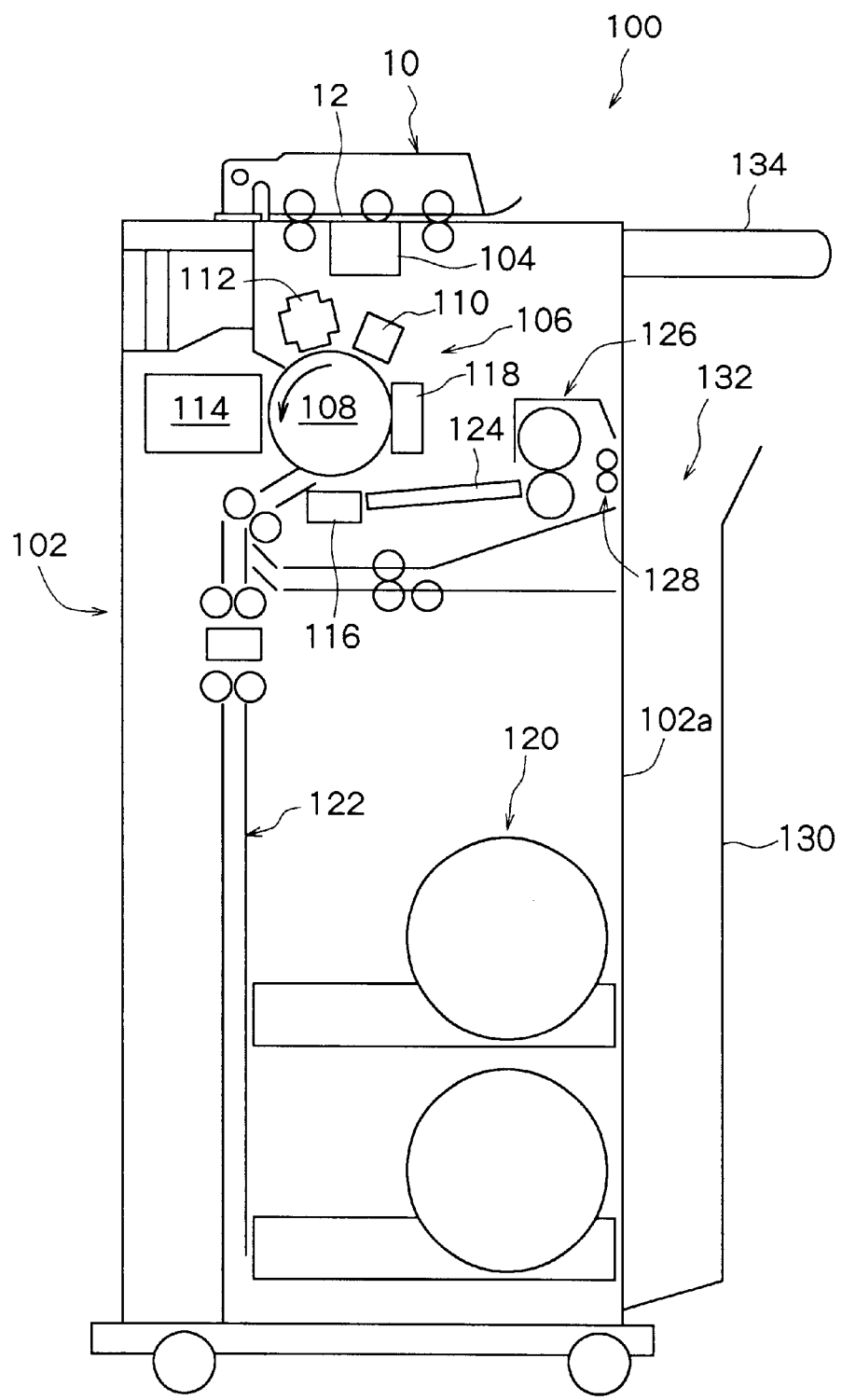
FIG. 1 is a side view illustrating the constitution of an embodiment of a copier equipped with a document conveying apparatus according to an embodiment of the present invention.

Referring to FIG. 1, an electrostatic copier which is generally designated at 100 has a nearly rectangular parallopiped copier body 102. A document conveying apparatus 10 that will be described later in detail is provided at an upper end of the copier body 102. A close-contact type image sensor 104 is disposed at an upper end in the copier body 102 right under the document conveying apparatus 10, and an image-forming portion 106 is disposed under the close-contact type image sensor 104. The image-forming portion 106 comprises a photosensitive material drum 108 that is rotated by a drive means that is not shown in the counterclockwise direction in FIG. 1. The photosensitive material drum 108 is surrounded by a main charger 110 for electrically uniformly charging the surface of the photosensitive material drum 108; an LED print head 112 for irradiating the surface of the photosensitive material drum 108 with the image of the document read by the close-contact type image sensor 104 to form an electrostatic latent image thereof; a developing device 114 for developing the electrostatic latent image formed on the surface of the photosensitive material drum 108 into a toner image; a transfer device 116 for transferring the toner image formed on the surface of the photosensitive material drum 108 onto a paper which may be a common paper; a cleaning device 118 for wiping off the toner remaining on the surface of the photosensitive material drum 108 to recover it; and the like. The image-forming portion 106 is constituted by the photosensitive material drum 108 and by the above-mentioned devices surrounding the photosensitive material drum 108.

At lower positions in the copier body 102, there are arranged a paper-holding portion 120 including a paper-feed roller and a paper conveyer passage 122 for conveying the paper held in the paper-holding portion 120 onto a transfer zone in the image-forming portion 106. The paper conveyer passage 122 is provided with paper conveyer rollers for conveying the paper wound on the paper-feed roller through the paper conveyer passage 122, a cutter for cutting the paper into a suitable length and the like. A paper conveyer passage 124 is provided on the downstream side of the transfer device 116 to convey the paper onto which the toner image has been transferred by the transfer device 116, and a fixing device 126 and discharge rollers 128 are provided at positions downstream of the paper conveyer passage 124. A front cover 130 is disposed on the front surface 102a (right end surface in FIG. 1) of the copier body 102. A pocket 132 is formed between the front cover 130 and the front surface 102a of the copier body 102 to hold the papers discharged by the discharge rollers 128. A document conveying passage 12 is formed on the upper end surface of the copier body 102, and a document-placing table 134 is disposed at an upstream end portion of the document conveying passage 12 in a manner to extend from the copier body 102.

The document is conveyed by the document conveying apparatus 10 along the document conveying passage 12 in a manner as described below and its image is read by the close-contact type image sensor 104. The image read by the close-contact type image sensor 104 is turned into a toner image through the image-forming portion 106 and is transferred onto the paper conveyed from the paper-holding portion 120. The toner image transferred onto the paper is fixed by the fixing device 126, recorded, and is discharged into the pocket 132 by the discharge rollers 128. The paper conveyed from the paper-holding portion 120 is cut by a cutter at a suitable timing into a predetermined length. The copying operation is executed by the copier 100 in a manner as roughly described above, thereby to form a copied document on which the image of the document is recorded.

Figure 2:
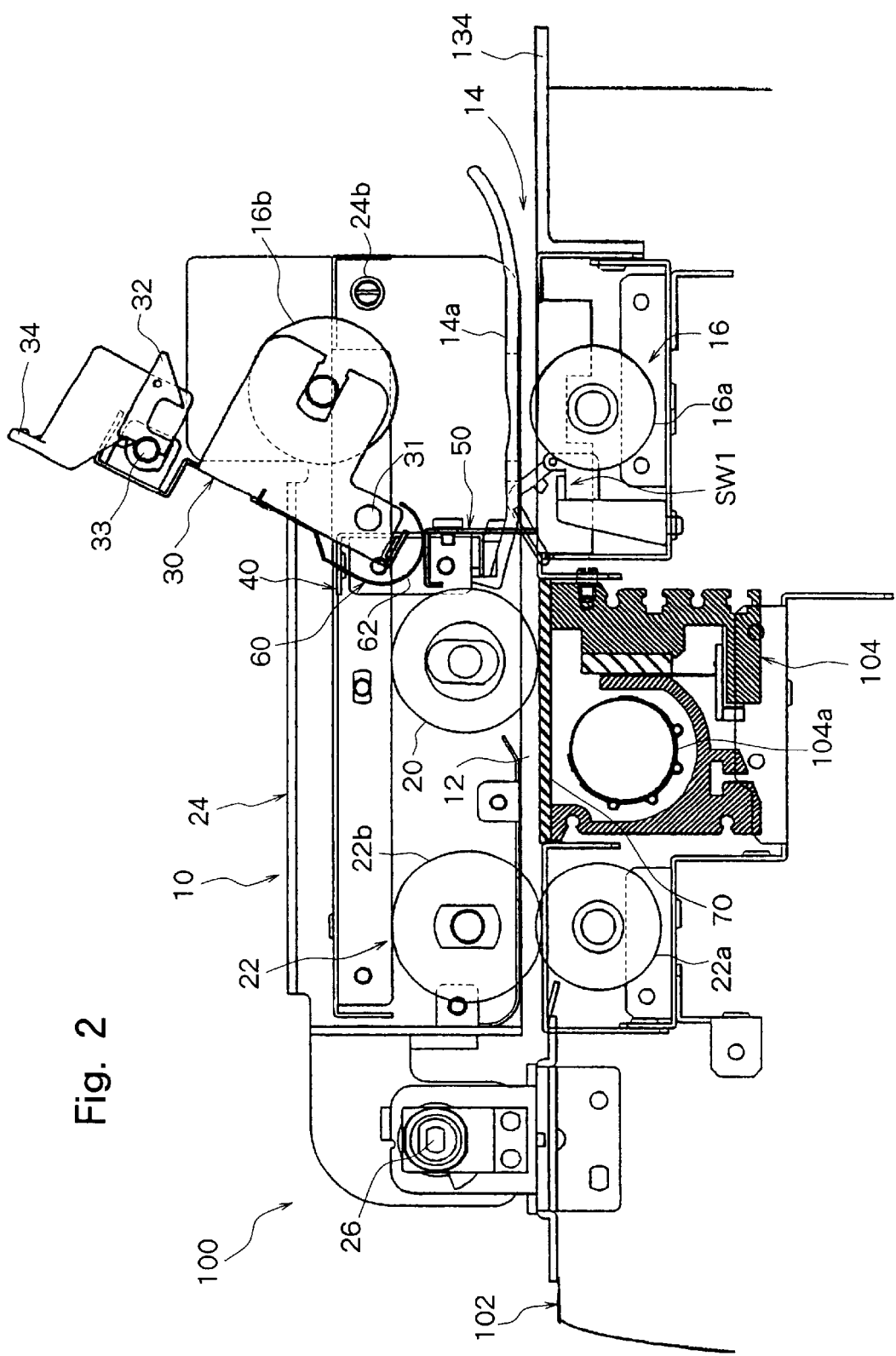
FIG. 2 is a sectional view schematically illustrating the constitution of the embodiment of the document conveying apparatus of the invention, with which the copier is provided.
Figure 3:
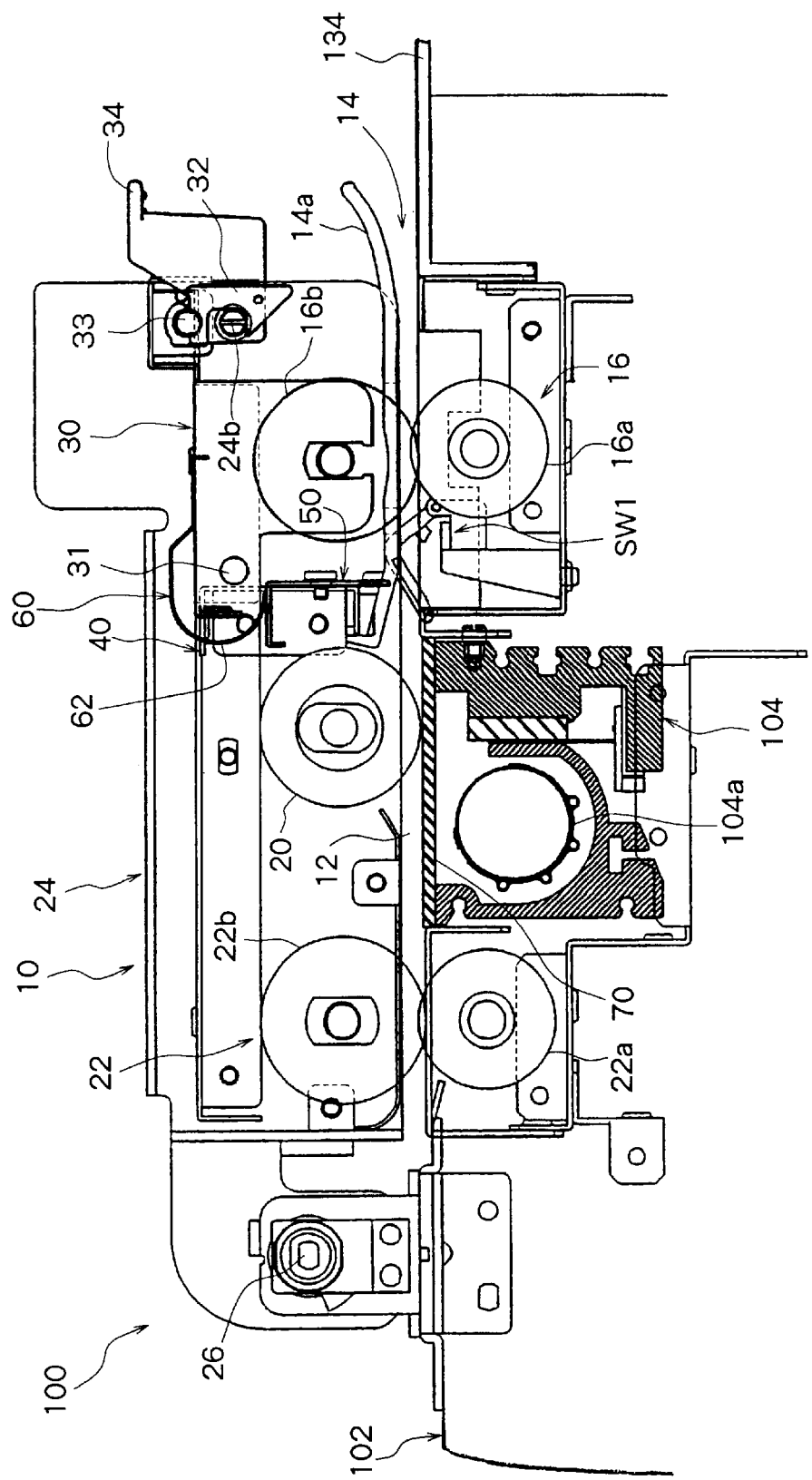
FIG. 3 is a sectional view illustrating another mode of operation of the document conveying apparatus shown in FIG. 2.
Figure 4:
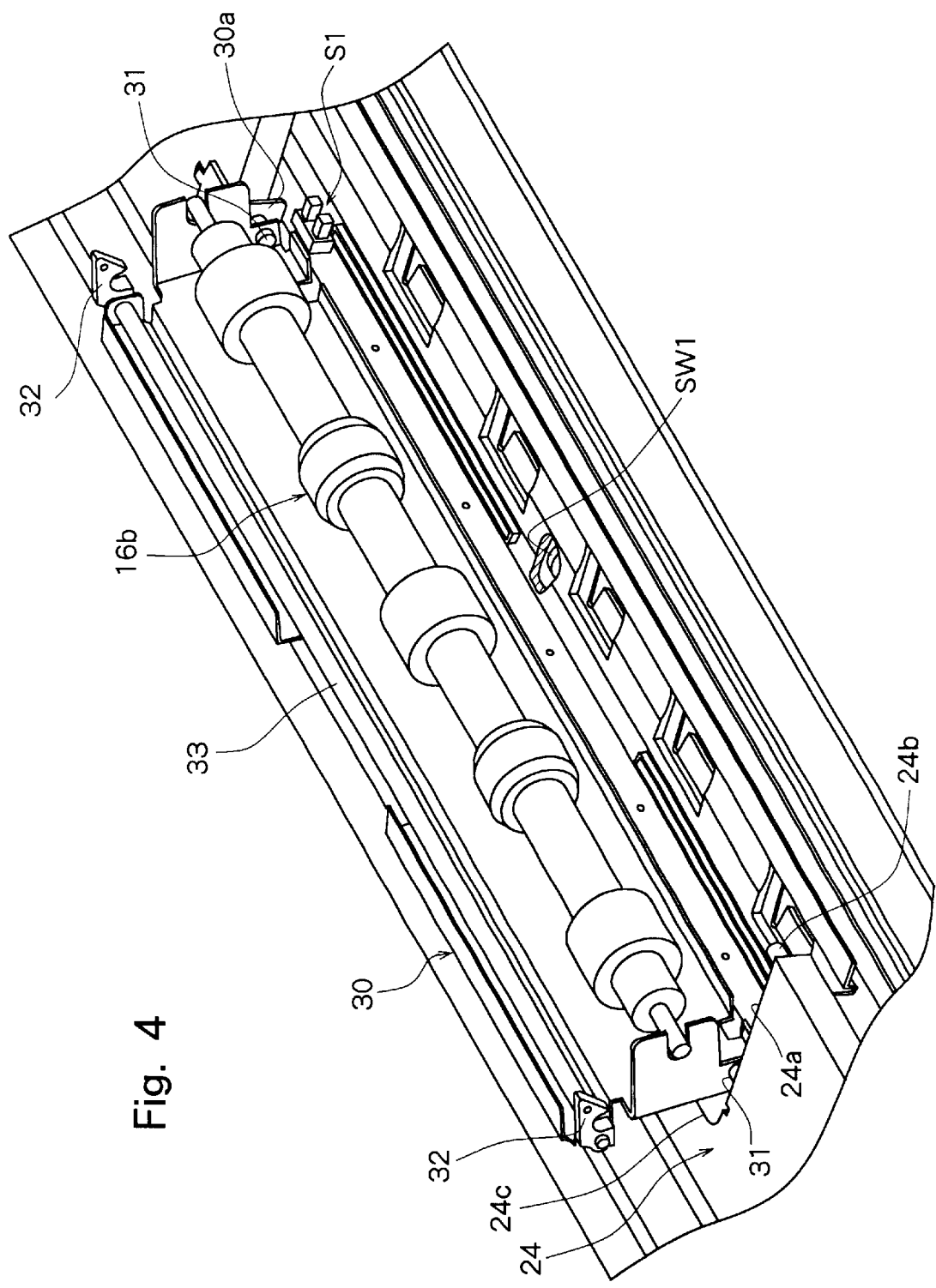
FIG. 4 is a perspective view illustrating a part of the document conveying apparatus shown in FIG. 2.

Next, described below is the document conveying apparatus 10 with which the copier 100 is provided. Referring to FIGS. 2 to 4, the document conveying apparatus 10 includes the document conveying passage 12 arranged to extend nearly horizontally, and a pair of document introduction rollers 16 disposed at a document insertion portion 14 in the document conveying passage 12. The document-placing table 134 is disposed on the upstream side of the document insertion portion 14. An upper guide plate 14a is arranged in the document insertion portion 14. The upper guide plate 14a is mounted on a support frame body 24 that will be described later. An end on the upstream side of the upper guide plate 14a is located on an upper side of the end of the downstream side of the document-placing table 134 maintaining a gap for inserting the document. On the downstream side of the pair of document introduction rollers 16 in the document conveying passage 12, there are arranged a document holder roller 20 and a pair of discharge rollers 22 in this order from the upstream side toward the downstream side. The pair of document introduction rollers 16 is constituted by a driven roller 16a and a follower roller 16b, and the pair of discharge rollers 22 is constituted by a driven roller 22a and a follower roller 22b. The document holder roller 20 is constituted by a follower roller.

A support frame body 24 is supported at an upper end of the copier body 102 so as to pivot on a turn shaft 26 between an open position where the support frame body permits at least a part of the region of the upper surface portion of the copier body 102 to be exposed upward and a closed position where the support frame body covers the region of the upper surface portion of the copier body 102. The turn shaft 26 is disposed at an end on the downstream side of the document conveying passage 12 in an upper end of the copier body 102. A cut-away portion 24a of nearly a rectangular shape as viewed from the upper surface (see FIG. 4) is formed at an end on the upstream side of the support frame body 24 at a central portion in the direction of width of the copier 100 (i.e., in the direction perpendicular to the surface of the paper in FIGS. 2 and 3). In the cut-away portion 24a of the support frame body 24, a cover frame 30 is rotatably supported via a turn shaft 31 which is disposed to protrude inward from both ends in the direction of the width, which are the ends on the downstream side of the cutaway portion 24a. The cover frame 30 can be molded as a unitary structure by using a suitable synthetic resin such as ABS resin. The driven roller 16a of the pair of document introduction rollers 16 and the driven roller 22a of the pair of discharge rollers 22 are rotatably disposed at the upper ends of the copier body 102. The document holder roller 20 and the driven roller 22b of the pair of discharge rollers 22 are rotatably disposed on the support frame body 24. The follower roller 16b of the pair of document introduction rollers 16 is rotatably disposed on the cover frame 30. The support frame body 24 is normally located at the closed position (position shown in FIGS. 2 to 4). In a state where the support frame body 24 is located at the closed position, the document holder roller 20 is brought into pressed contact with the upper surface of a glass 70 that will be described later, and the follower roller 22b of the pair of discharge rollers 22 is brought into pressed contact with the driven roller 22a.

The cover frame 30 is supported to pivot on the turn shaft 31 selectively between a closed position (that is a position shown in FIG. 2) where the follower roller 16b of the pair of document introduction rollers 16 is brought into pressed contact with the driven roller 16a and an open position (that is a position shown in FIG. 3) where the follower roller 16b is separated upward away from the driven roller 16a. A pair of engaging pins 24b (only one of them is shown in FIGS. 2 to 4) are disposed extending inward from both ends in the direction of width of the cut-away portion 24a, which are the ends on the upstream side of the cut-away portion 24a of the support frame body 24. To-be-engaged hooks 32 are disposed at both ends in the direction of width, which are the ends on the upstream side of the cover frame 30. The to-be-engaged hooks 32 are each integrally mounted on a common turn shaft 33 that extends in the direction of width of the cover frame 30. An unlocking lever member 34 (see FIGS. 2 and 3) is integrally mounted on the turn shaft 33 at a central portion in the direction of axis thereof. The unlocking lever member 34 is not shown in FIG. 4. A spring member that is not shown is disposed between the unlocking lever member 34 and the cover frame 30, and urges the to-be-engaged hooks 32 toward the engaging direction via the turn shaft 33.

Referring to FIGS. 2 to 6, a stay 40 is disposed on the downstream side of the turn shaft 31 of the cover frame 30 of the support frame member 24 so as to extend in the axial direction of the turn shaft 31 (i.e., in the direction of width of the copier 100). The stay 40 that can be formed of a metal plate such as steel plate comprises a body portion 41 that extends in the vertical direction as viewed in the direction of width thereof (i.e., in the direction of length of the stay 40) and an upper flange 42 and a lower flange 43 that extend from an upper end and from a lower end of the body portion 41 at right angles with the downstream direction, and forms a channel shape as a whole. The stay 40 has mounting flanges 44 formed at both ends in the direction of length. The mounting flange 44 of one side only is shown in FIGS. 2, 3, 5 and 6. The stay 40 is mounted on the support frame body 24 via the mounting flanges 44, and the open side of the channel shape is disposed facing the downstream direction. A notch 45 is formed in the central portion in the lengthwise direction of the body portion 41 of the stay 40 and the upper flange 42, and the notch 45 extends from an upper end of the stay 40 to a lower end thereof and extends over a predetermined range in the lengthwise direction. Plural support pins 46 with head are screwed into the lower end portion where the notch 45 is formed in the body portion 41 from the upstream side toward the downstream side at intervals in the lengthwise direction. A predetermined gap is formed between the head of the support pin 46 and the vertical surface on the upstream side of the body portion 41.

A shutter member 50 is supported by the stay 40 disposed on the downstream side of the pair of document introduction rollers 16 of the support frame body 24 so as to freely moves up and down between a shut-off position (see FIGS. 2 and 5) where the shutter member 50 shuts off the document conveying passage 12 and the leading end of the document inserted in the document conveying passage 12 from the document insertion portion 14 comes in contact with the shutter member to enable the document to be positioned and an open position (see FIGS. 3 and 6) where the shutter member 50 retracts upward from the document conveying passage 12 permitting the document to be introduced. The shutter member 50 which can be formed of a metal plate such as steel plate comprises a shutter portion 51 that extends in the vertical direction as viewed in the direction of width (i.e., in the lengthwise direction of the shutter member 50) and an upper flange 52 that extends from the upper end of the shutter portion 51 at right angles with the downstream direction, and has an L-shape as a whole. The length of the shutter member 50 in the lengthwise direction is smaller than the length of the notch 45 in the stay 40 in the lengthwise direction. Plural notches 55 extending from the upper end of the shutter portion 51 toward the lower end thereof and having a predetermined width and depth are formed in the shutter portion 51 of the shutter member 50 at intervals in the lengthwise direction. The notch 55 extends up to part of the regions near the bent portion of the upper flange 52. The notches 55 are formed in the shutter portion 51 at positions to be in match with the support pins 46 screwed into the body portion 41 of the stay 40. The width of the notch 55 of the shutter portion 51 is slightly larger than the diameter of the support pin 46 but is smaller than the diameter of the head of the support pin 46. The above-mentioned predetermined gap formed between the head of the support pin 46 and the vertical surface on the upstream side of the body portion 41, is slightly larger than the thickness of the plate of the shutter portion 51.

The notches 55 in the shutter portion 51 are fitted to the corresponding support pins 46 to support the shutter member 50 so as to be moved up and down relative to the stay 40. The upper flange 52 of the shutter member 50 is so positioned as to extend in the downstream direction from the body portion 41 in the notch 45 of the stay 40 between the upper flange 42 and the lower flange 43. Plural compression coil springs 56 are arranged between the lower flange 43 of the stay 40 and the upper flange 52 of the shutter member 50 to urge the shutter member 51 toward the open position. The mounting positions of the compression coil springs 56 are held by a suitable retainer means. The retainer means can be constituted by, for example, holding pawls (not shown) disposed on the lower flange 43 of the stay 40 and on the upper flange 52 of the shutter member 50, and work to hold the mounting positions of the compression springs 56 by bringing the upper ends and the lower ends of the compression coil springs 56 into engagement with the holding pawls that are not shown.

Leaf spring members 60 are arranged in a plural number on the cover frame 30 at intervals in the lengthwise direction of the cover frame 30 to constitute a cam means for moving the shutter member 50 up and down. The ends on one side of the leaf spring members 60 are coupled to an upper surface at a downstream end of the cover frame 30. The leaf spring members 60 extend in the downstream direction from the ends on one side of the leaf spring members 60 maintaining a distance to the upper surface of the cover frame 30 along the above upper surface and then, in an eccentric semicircular shape on the turn shaft 31 of the cover frame 30 while maintaining a distance spaced from the turn shaft 31. That is, the ends on the other side of the leaf spring members 60 are formed in nearly an arcuate shape, and the outer peripheral arcuate surfaces thereof form cam surfaces 62. In this embodiment, the positional relationship between the cam surfaces 62 and the shutter member 50 is so defined that the cam surfaces 62 comes in contact with the upper surface of the upper flange 52 of the shutter member 50 at all times. The upper surface 52a of the upper flange 52 of the shutter member 50 defines the to-be-depressed surface.

The driven roller 16a of the pair of document introduction rollers 16 is drive-coupled (not shown) to an electric motor M which is a drive source provided in the copier body 102 via a power transmission mechanism inclusive of an electromagnetic clutch CL. The driven roller 22a of the pair of discharge rollers 22 is drive-coupled (not shown) to the electric motor M through a power transmission mechanism. The document holder roller 20 is drive-coupled to the follower roller 22a of the pair of discharge rollers 22 through a pulley and a belt that are not shown. A document-reading position is provided in the document conveying passage 12, and a glass 70 having a horizontal upper surface is disposed at the document-reading position. The glass 70 is disposed at an upper end of the copier body 102. The above-mentioned close-contact type image sensor 104 inclusive of a fluorescent lamp 104a which is a source of light is disposed in the copier body 102 under the glass 70. An inserted document detector switch SW1 which forms the inserted document detector means is disposed just on the downstream side of the pair of document introduction rollers 16 in the document conveying passage 12 to detect a document that is inserted in the document insertion portion 14. The inserted document detector switch SW1 is constituted by a microswitch. Further, an open/close position detector sensor S1 (see FIG. 4) which forms the open/close position detector means is disposed at a lower position near one end in the direction of width of the cut-away portion 24a in the support frame body 24 to detect the open position and closed position of the cover frame 30. The open/close position detector sensor S1 is constituted by an optical transmission-type sensor (photo interrupter sensor), and is disposed on a locus of turn of one side wall 30a (see FIG. 4) of the cover frame 30 supported in the cut-away portion 24a of the support frame body 24 so as to be freely opened and closed. When the cover frame 30 is brought to the open position, the side wall 30a of the cover frame 30 is retracted from the open/close position detector sensor S1 and hence, the open/close position detector sensor S1 is turned on. When the cover frame 30 is brought to the closed position, the side wall 30a of the cover frame 30 is positioned in the open/close position detector sensor S1 and accordingly, the open/close position detector sensor S1 is turned off.

Figure 7:
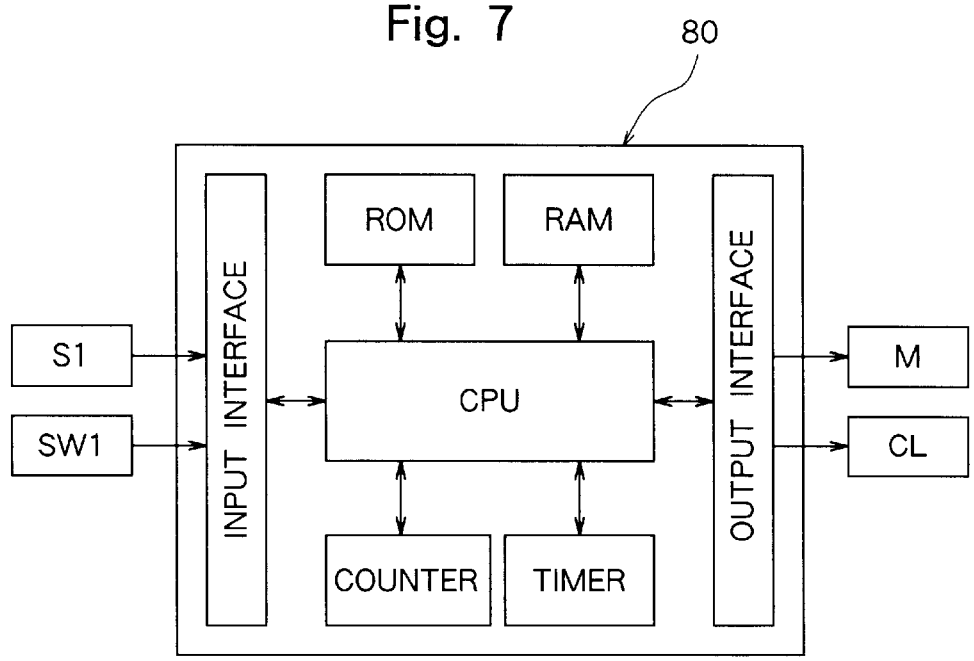
FIG. 7 is a diagram schematically illustrating the constitution related to controlling the operation of the document conveying apparatus of the present invention.

Referring to FIG. 7, the document conveying apparatus 10 is equipped with a control means (controller) 80. The control means 80 is constituted by a microcomputer which comprises a central processing unit (CPU) for executing the operation according to a control program, a ROM storing the control program, a RAM storing the results of operation, a counter, a timer, an input interface and an output interface. The input interface of the thus constituted control means 80 receives detection signals from the inserted document detector switch SW1, the open/close position detector sensor S1, other sensors and switches, and the output interface sends control signals to the electric motor M, electromagnetic clutch CL, etc.

Figure 5:
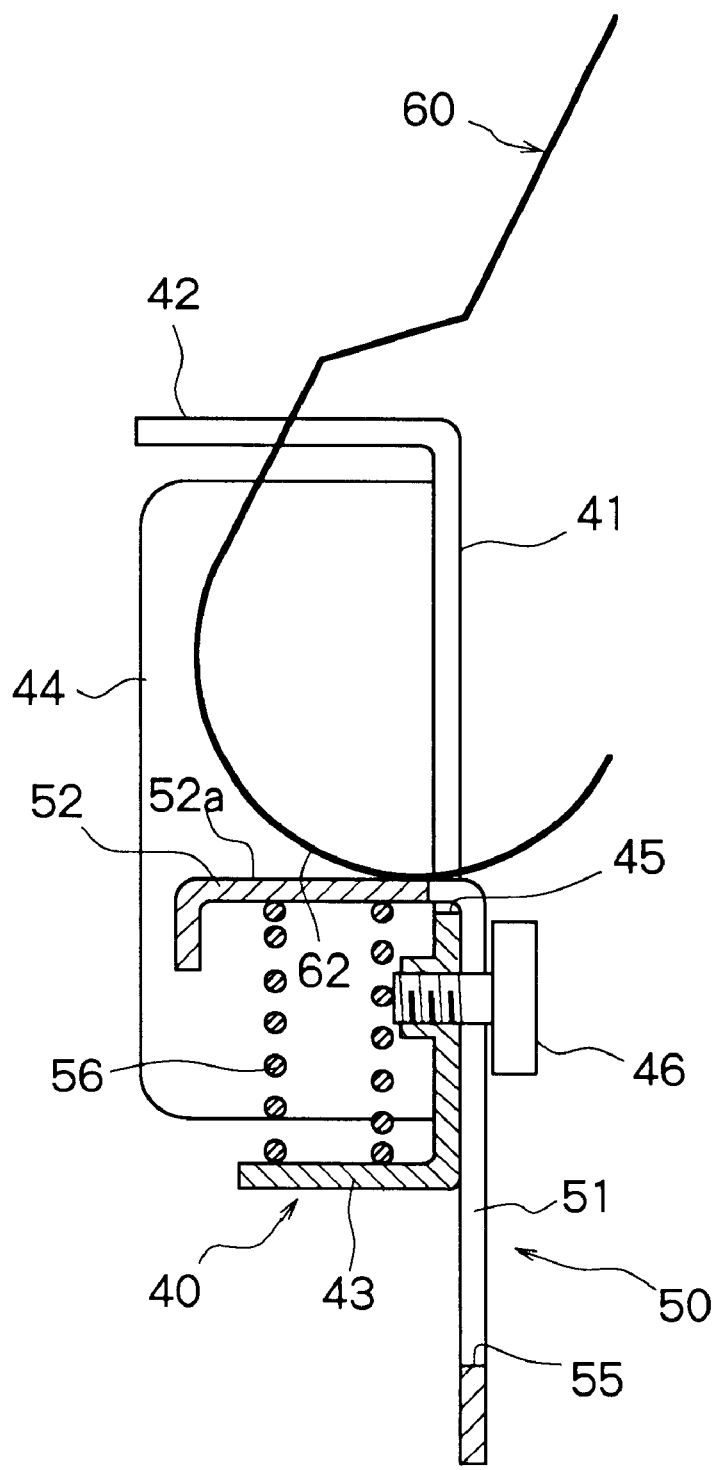
FIG. 5 is a schematic sectional view illustrating, on an enlarged scale, a major portion of the document conveying apparatus shown in FIG. 2.

Described below is the operation of the document conveying apparatus 10 constituted as described above. Referring to FIGS. 2 and 5, when it is attempted to copy the document, first, the cover frame 30 is opened (brought to the open position) from the closed position shown in FIG. 3 by being turned counterclockwise on the turn shaft 31 in FIG. 3. Prior to opening the cover frame 30, the unlocking lever member 34 is turned counterclockwise in FIG. 2, and the to-be-engaged hooks 32 are each disengaged from the engaging pins 24b. When the cover frame 30 is turned counterclockwise on the turn shaft 31 toward the open position, the cam surfaces 62 of the leaf spring members 60 mounted on the cover frame 30 push the to-be-depressed surface 52a of the upper flange 52 of the shutter member 50 down against the compression coil springs 56. The contact portions between the cam surfaces 62 of the leaf spring members 60 and the to-be-depressed surface 52a of the shutter member 50 move downward (toward the lower tilted direction in FIG. 2) away from the turn shaft 31 as the cover frame 30 is turned toward the opening direction. Accordingly, when the cover frame 30 is turned up to the open position, the cam surfaces 62 of the leaf spring members 60 depress the to-be-depressed surface 52a of the shutter member 50 to bring it to the acting position where the shutter member 50 moves down to the shut-off position against the compression coil springs 56. That is, when the cover frame 30 is turned to the open position, the shutter member 50 moves down against the compression coil springs 56 due to the resilient push-down action of the leaf spring members 60 and consequently, is brought to the shut-off position. The leaf spring members 60 brought to the acting position urge the cover frame 30 toward the counterclockwise direction on the turn shaft 31 in FIG. 2 and holds it at the open position. Therefore, the cover frame 30 needs not be held by hand in an open state, which is convenient in practice. Besides, since the cover frame 30 is held at the open position by utilizing the leaf spring members 60 which are for actuating the shutter member 50, no particular spring member is necessary for holding the cover frame 30 at the open position giving advantage in cost and space.

Then, the document that is not shown is manually inserted by the user into the document insertion portion 14 of the document conveying apparatus 10 through a gap between the document-placing table 134 and the upper guide plate 14a. The follower roller 16b of the pair of document introduction rollers 16 is separated upward away from the driven roller 16a, and the nip portion between the follower roller 16b and the driven roller 16a is opened. Therefore, the leading end of the document inserted in the document conveying apparatus from the document insertion portion 14 passes over the upper end region of the outer peripheral surface of the driven roller 16a of the pair of document introduction rollers 16 and advances in the downstream direction. The leading end of the document is brought into contact with the vertical surface on the upstream side of the shutter portion 51 of the shutter member 50 that has been brought to the shut-off position, and is blocked from moving in the downstream direction and is positioned in the direction of conveying the document. And at this moment, the leading end of the document is positioned to be at right angles with the direction of conveying the document due to the vertical surface on the upstream side of the shutter portion 51 of the shutter member 50. The manual operation for positioning the leading end of the document to be at right angles with the direction of conveyance can be carried out by simply bringing the end of the document into contact with the vertical surface on the upstream side of the shutter portion 51 of the shutter member 50 that is positioned at right angles with the direction of conveying the document. Therefore, the operation is very simple and the leading end is correctly positioned, compared with the manual operation of inserting the leading end of the document in the nip portion of the pair of document introduction rollers 16 required by the conventional device. The above-mentioned operation effect is accomplished similarly even when the document has a large size, e.g., has a JIS A0-size. When the leading end of the document is inserted in the document insertion portion 14, the inserted document detector switch SW1 is turned on.

Figure 6:
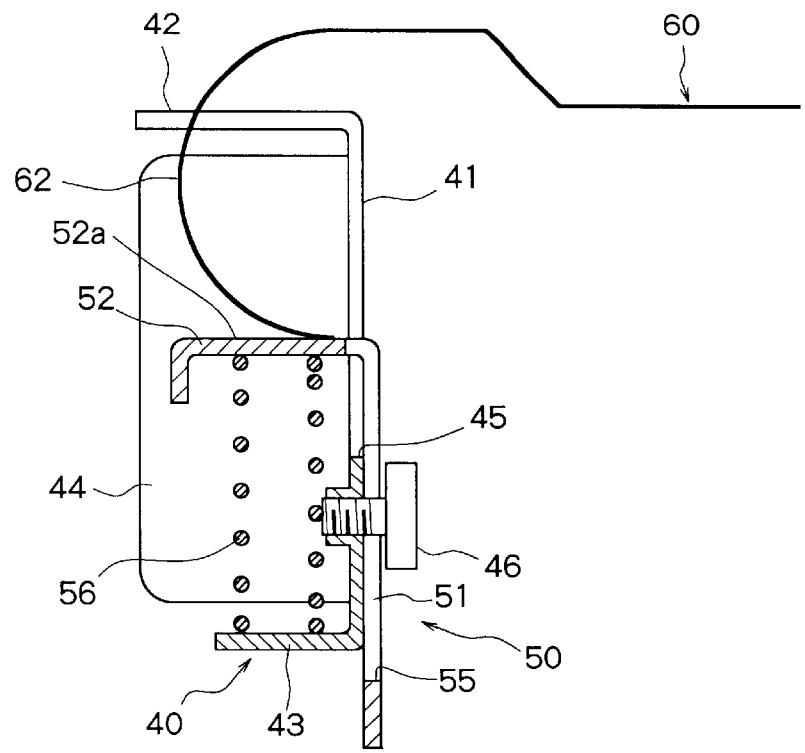
FIG. 6 is a schematic sectional view illustrating, on an enlarged scale, a major portion of the document conveying apparatus shown in FIG. 2.

Referring next to FIGS. 3 and 6, after the end of the document is positioned to be at right angles with the direction of conveying the document by the vertical surface on the upstream side of the shutter portion 51 of the shutter member 50 as described above, the cover frame 30 is closed (brought to the closed position) from the open position shown in FIG. 2 by being turned clockwise on the turn shaft 31 in FIG. 2. The to-be-engaged hooks 32 of the cover frame 30 are each brought into engagement with the engaging pins 24b, and the cover frame 30 is locked to the closed position. When the cover frame 30 is turned clockwise on the turn shaft 31 toward the closed position, the cam surfaces 62 of the leaf spring members 60 attached to the cover frame 30 gradually cease to depress the to-be-depressed surface 52a of the shutter member 50 and, finally, permit the shutter member 50 to move up to the open position by the compression coil springs 56. The contact portion between the cam surfaces 62 of the leaf spring members 60 and the to-be-depressed surface 52a of the shutter member 50 approaches toward the turn shaft 31 (in the tilted direction in FIG. 3) as the cover frame 30 is turned toward the closing direction. Accordingly, when the cover frame 30 is turned up to the closed position, the cam surfaces 62 of the leaf spring members 60 attached to the cover frame 30 substantially cease to depress the to-be-depressed surface 52a of the shutter member 50 to bring it to the non-acting position where the shutter member 50 is moved up to the open position by the compression coil spring 56. That is, when the cover frame 30 is turned up to the closed position, the shutter member 50 is moved up due to resilient push-up action of the compression coil springs 56, and is brought to the open position. The follower roller 16b of the pair of document introduction rollers 16 is brought into pressed contact with the driven roller 16a via the leading end of the document that is inserted. Accordingly, the leading end of the document is nipped by the driven roller 16a and the follower roller 16b constituting the pair of document introduction rollers 16. When the cover frame 30 is brought to the closed position, the open/close position detector sensor S1 is turned off.

As described above, when the leading end of the document is inserted in the document insertion portion 14 and the cover frame 30 is brought to the closed position, the control means 80 receives a detection signal (ON-signal) from the inserted document detector switch SW1 and a detection signal (OFF-signal) from the open/close position detector sensor S1, energizes the electromagnetic clutch CL after a lapse of a predetermined period of time and rotatively drives the electric motor M. Thereby, the pair of document introduction rollers, the document holder roller 20 and the pair of discharge rollers 22 are rotated. The document nipped by the pair of document introduction rollers 16 is conveyed in the downstream direction along the document conveying passage 12 and is, then, conveyed in cooperation with the document holder roller 20 and the pair of discharge rollers 22. At the time when the document passes over the glass 70 at the image-reading position, it is brought into close-contact with the upper horizontal surface of the glass 70 by the document holder roller 20, whereby correct reading of the image is guaranteed. At the start of conveyance of the document, the leading end of the document has been nipped by the pair of document introduction rollers 16 in a state of being correctly positioned to be at right angles with the direction of conveyance due to the vertical surface on the upstream side of the shutter portion 51 of the shutter member 50. Even at a moment when the pair of document introduction rollers 16 are rotated, therefore, the document is reliably prevented from being arranged aslant and is conveyed in the direction of conveyance while being maintained a correct position. Namely, the document is reliably prevented from being fed aslant and is reliably prevented from being damaged.

When the trailing end of the document passes over the inserted document detector switch SW1 and the inserted document detector switch SW1 is turned off, the control means 80 de-energizes the electromagnetic clutch CL to discontinue the rotation of the driven roller 16a of the pair of document introduction rollers 16. The pair of document introduction rollers 16 cease to rotate. Further, after a lapse of a predetermined period of time from when the trailing end of the document has passed over the inserted document detector switch SW1 and the inserted document detector switch SW1 is turned off, i.e., when it is judged by the control means 80 that the trailing end of the document has passed through the pair of discharge rollers 22 and the document is completely discharged out of the document conveying apparatus 10, the operation of the electric motor M is brought into a halt. Thereby, the pair of discharge rollers 22 and the document holder roller 20 cease to rotate.

The image of the document conveyed by the document conveying apparatus 10 in the above described manner, is read by the close-contact type image sensor 104 as it passes through the image-reading position disposed on the way of the document conveying passage 12. The image read by the close-contact type image sensor 104 is turned into a toner image through the image-forming portion 106. The toner image is transferred and fixed onto the paper conveyed from the paper-holding portion 120 thereby to copy the document. The above copying operation is as described already and its details are not described here. According to the copier 100 equipped with the above-mentioned document conveying apparatus 10 as will be obvious from the above description, smooth execution of the image recording is guaranteed and a high image-forming efficiency is maintained.

Figure 8:
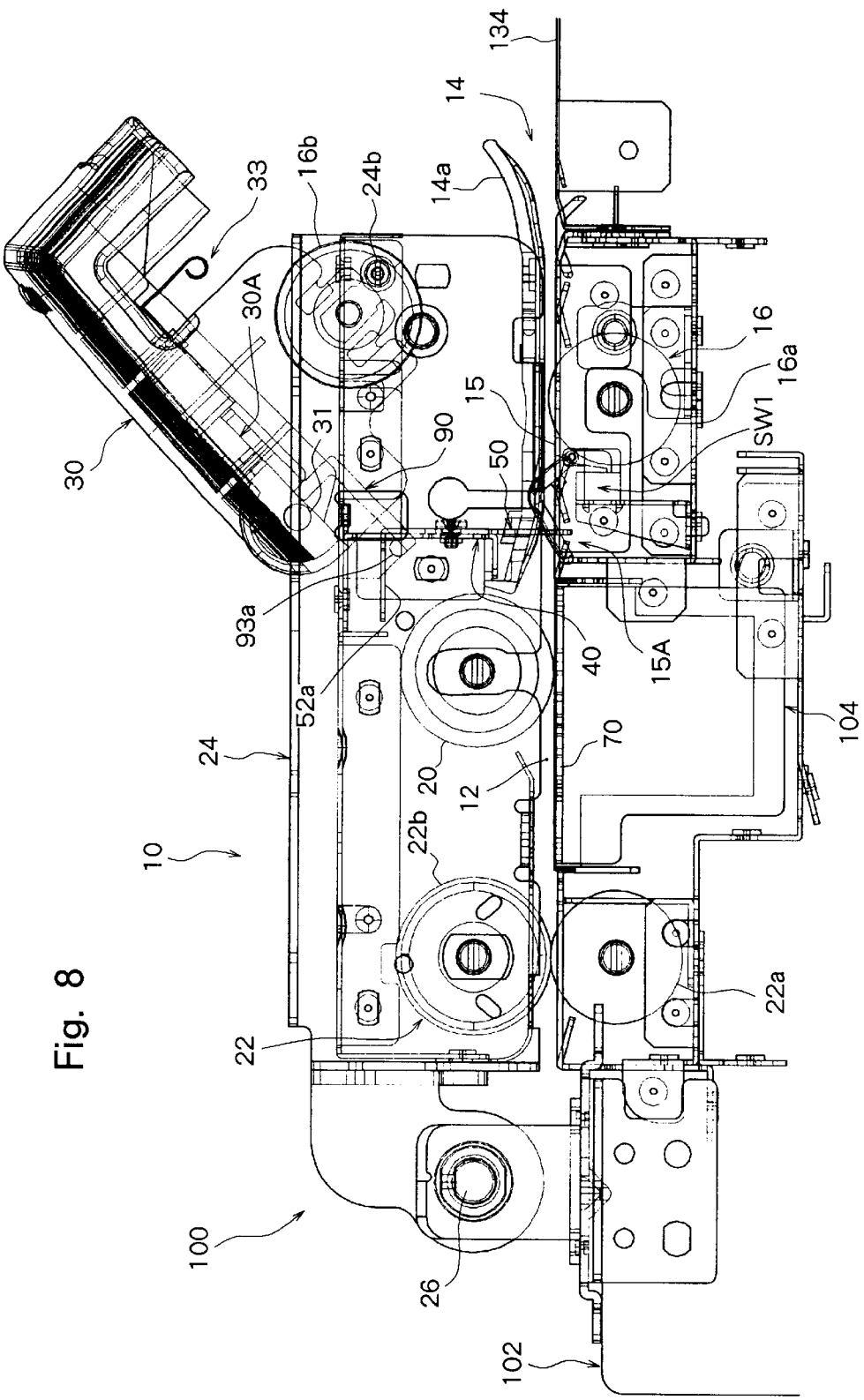
FIG. 8 is a sectional view schematically illustrating the constitution of another embodiment of the document conveying apparatus of the invention, with which the copier is provided.
Figure 9:
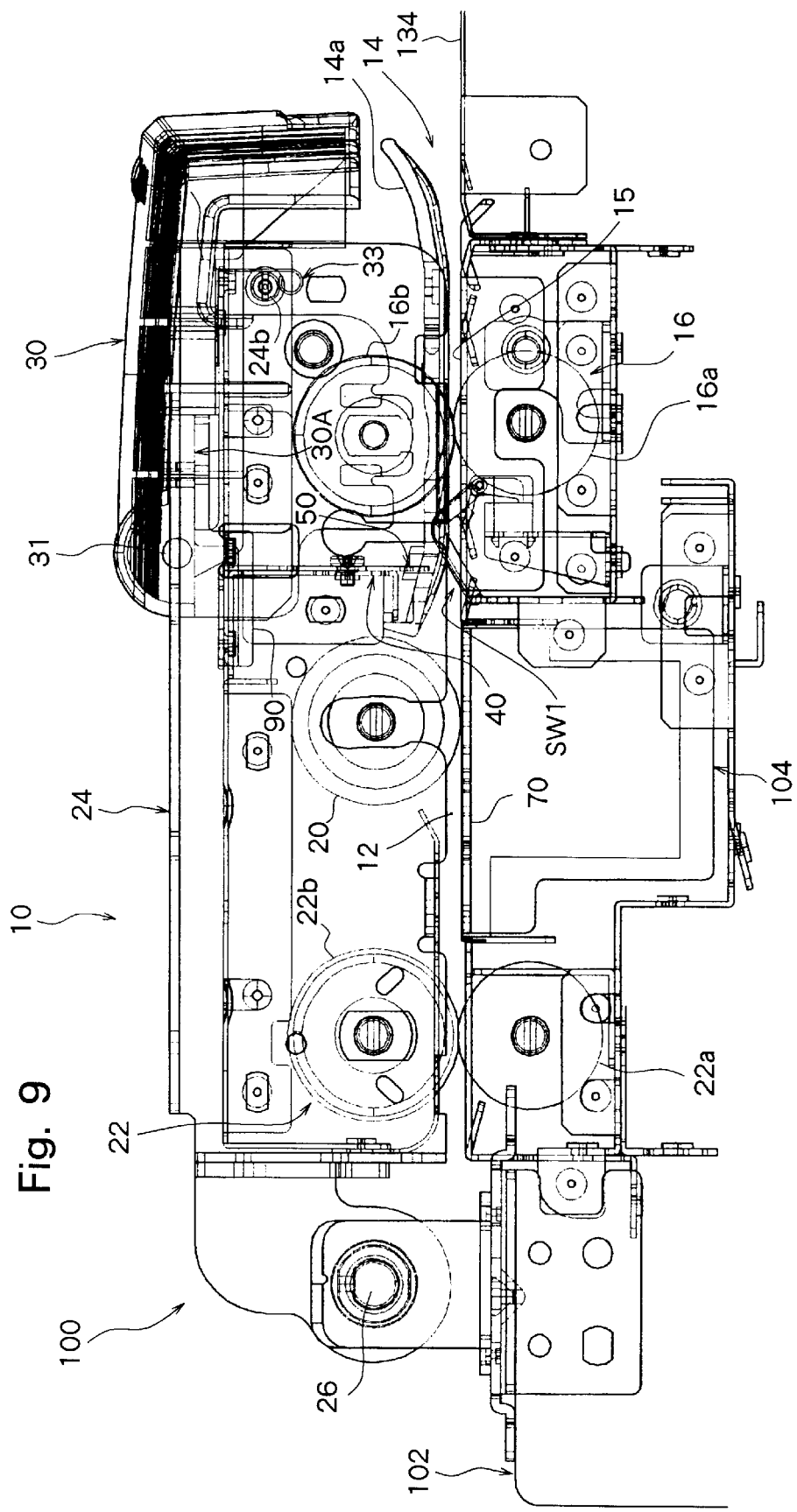
FIG. 9 is a sectional view illustrating another mode of operation of the document conveying apparatus shown in FIG. 8.

Next, another embodiment of the document conveying apparatus 10 according to the present invention will be described with reference to FIGS. 8 to 13. Referring, first, to FIGS. 8 and 9, an electrostatic copier 100 is provided with a copier body 102 and with a document conveying apparatus 10 at an upper end of the copier body 102. The constitution of the copier 100 including the copier body 102 is substantially the same as that of the copier 100 shown in FIG. 1 and is not, hence, described here. As will be obvious from the following description, the document conveying apparatus 10 shown in FIGS. 8 and 9 includes a cover frame 30 and a shutter member 50 which are interlocked to each other such that when the cover frame 30 is turned to the closed position, the shutter member 50 is moved up to the open position and when the cover frame 30 is turned to the open position, the shutter member 50 is moved down to the shut-off position, like that of the document conveying apparatus 10 shown in FIGS. 2 and 3. Here, however, the specific constitution of the mechanism interlocking the cover frame 30 and the shutter member 50 together provided in the document conveying apparatus 10 shown in FIGS. 8 and 9, is different from the interlocking mechanism in the document conveying apparatus 10 shown in FIGS. 2 and 3. The basic constitution in other respects is substantially the same. Therefore, described below are chiefly those portions which are different, and the portions which are substantially in common are denoted by the same reference numerals but are not described again.

To-be-engaged hooks 33 are disposed at both ends of the cover frame 30 in the direction of width at the ends on the upstream side thereof. The to-be-engaged hooks 33 are formed by being curled at the lower ends of the leaf spring members extending straight and are mounted on the cover frame 30 so as to hang from the inside at both ends in the direction of width of the cover frame 30. The cover frame 30 is not provided with the unlocking lever 34 used in the embodiment described earlier. When the cover frame 30 is turned in the clockwise direction in FIG. 8 from the open position to the closed position, the curled portions of the to-be-engaged hooks 33 get over the corresponding engaging pins 24b and elastically and detachably engaged at the lower side of the engaging pins 24b due to the elastic deformation of the to-be-engaged hooks 33, thereby to hold the cover frame 30 at the closed position (see FIG. 9). Further, when the cover frame 30 is turned counterclockwise in FIG. 9 from the closed position to the open position, the curled portions of the to-be-engaged hooks 33 get over the corresponding pins 24b due to elastic deformation and move to the upper side of the engaging pins 24b and are, hence, disengaged from the corresponding engaging pins 24b, permitting the turn to the open position.

Figure 10:
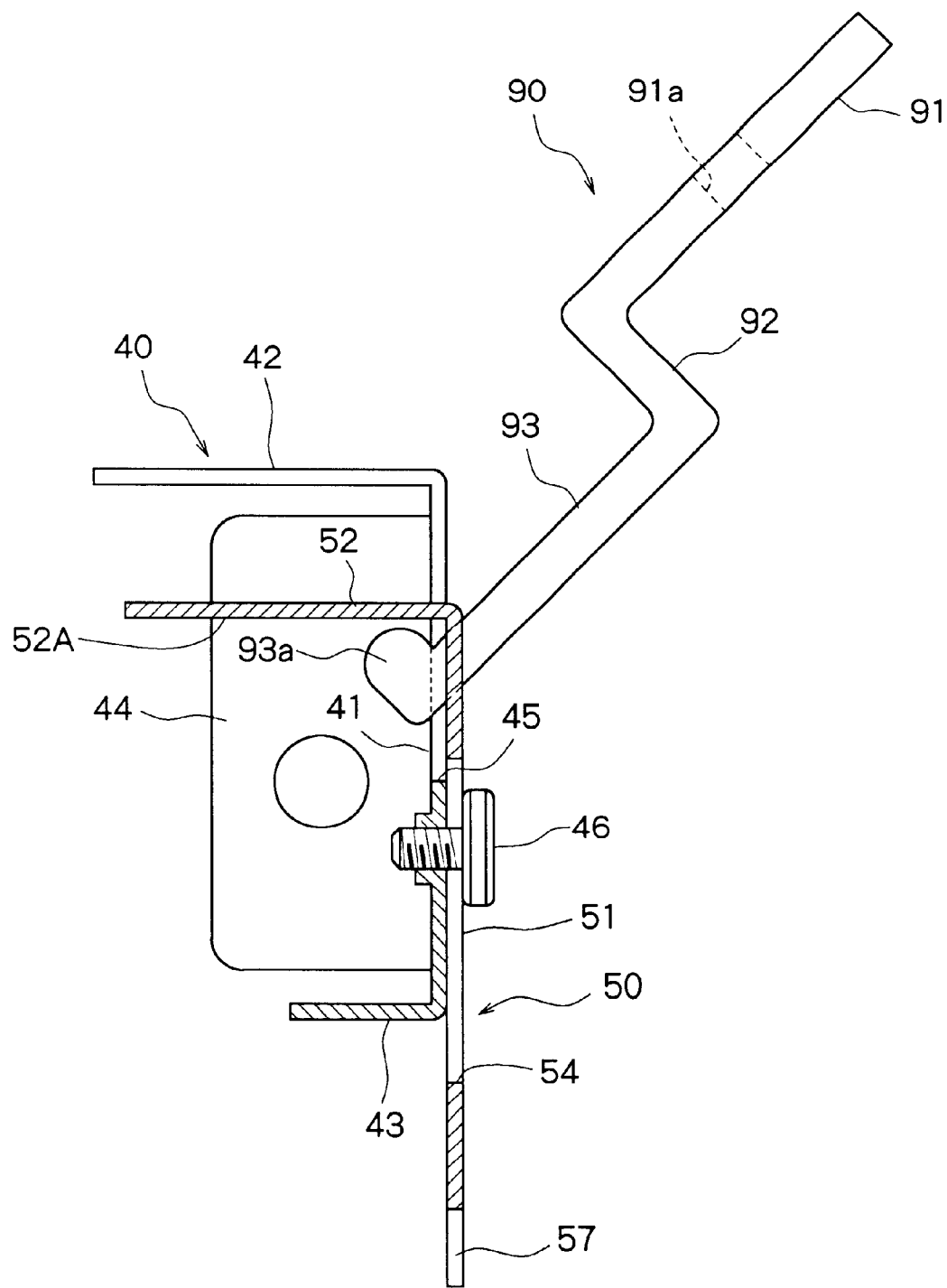
FIG. 10 is a schematic sectional view illustrating, on an enlarged scale, a major portion of the document conveying apparatus shown in FIG. 8.
Figure 11:
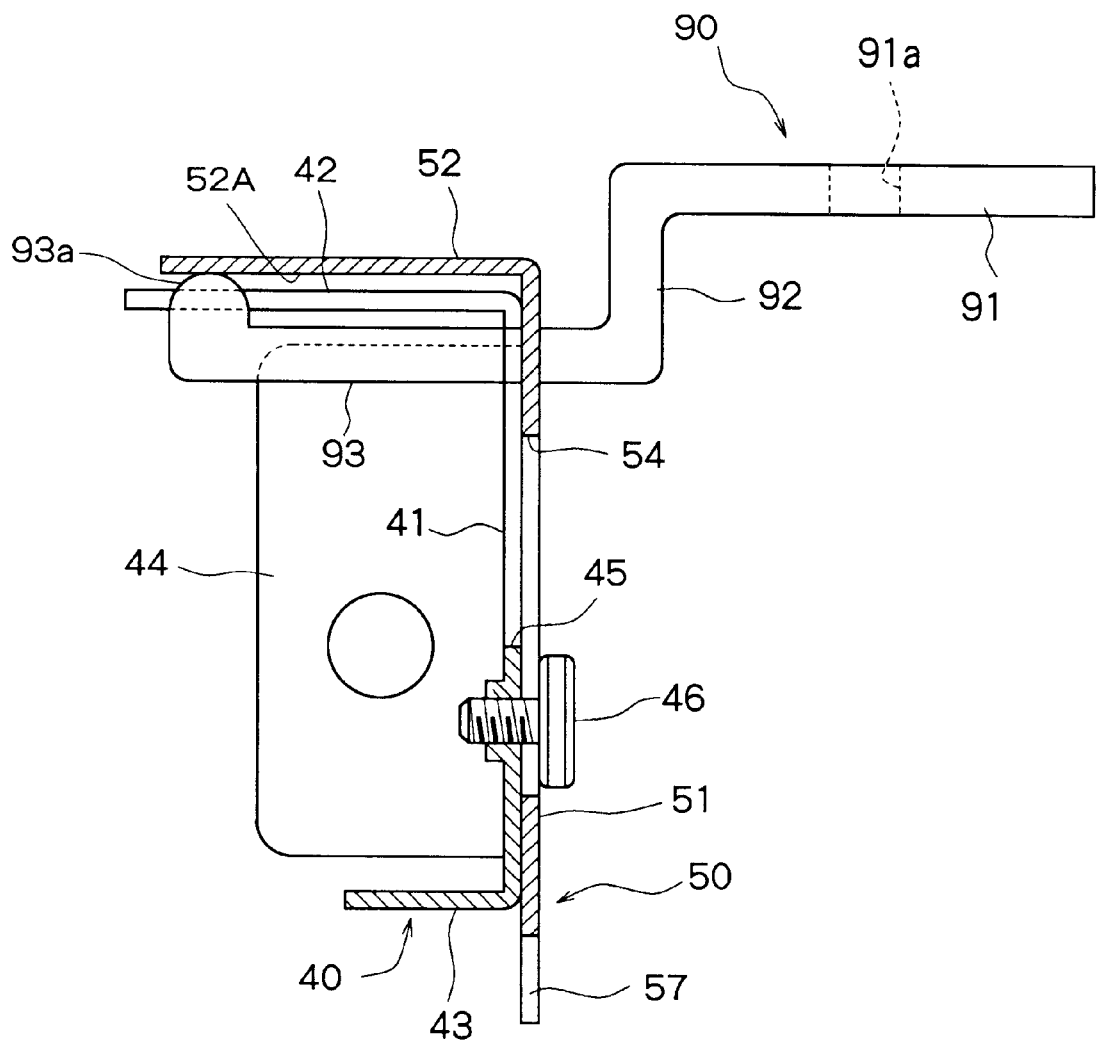
FIG. 11 is a schematic sectional view illustrating, on an enlarged scale, a major portion of the document conveying apparatus shown in FIG. 9.
Figure 12:
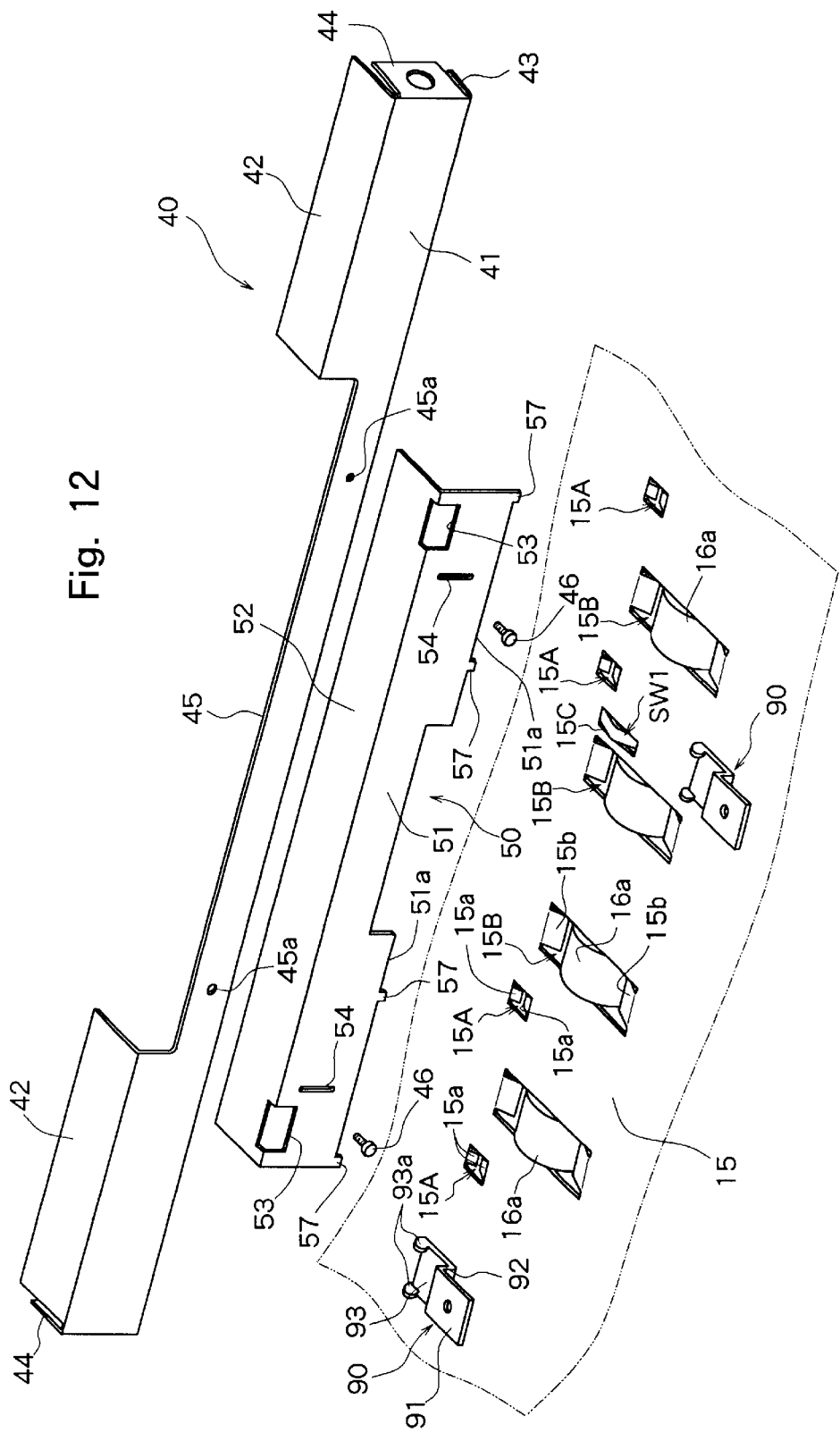
FIG. 12 is a perspective view illustrating the constituent members shown in FIG. 8 in a disassembled manner on a contracted scale.

A stay 40 is disposed at a position just on the downstream side of the turn shaft 31 of the cover frame 30 of the support frame body 24 and above the document conveying passage 12 so as to extend in the axial direction of the turn shaft 31 (i.e., in the direction of width of the copier 100). Referring to FIGS. 10 to 12, the stay 40 that can be formed of a metal plate such as a steel plate comprises a body portion 41 extending in the vertical direction, an upper flange 42 and a lower flange 43 extending from an upper end and a lower end of the body portion 41 at right angles with the downstream direction as viewed in the direction of width, i.e., as viewed in the lengthwise direction of the stay 40, and is nearly in a channel shape as viewed in the direction of the width. Mounting flanges 44 are formed at both ends of the stay 40 in the lengthwise direction. The stay 40 is mounted on the support frame body 24 via the mounting flanges 44, and the open side of its channel shape is disposed facing the downstream direction. A notch 45 extending over a predetermined range in the lengthwise direction from an upper end to a lower end thereof is formed in the body portion 41 of the stay 40 and in the central portion of the upper flange 42 in the lengthwise direction. Threaded holes 45a of a plural number, or of a number of two in this embodiment, are formed in the lower end portion where the notch 45 is formed in the body portion 41, and support pins 46 with head are screwed into the threaded holes 45a, from the upstream side toward the downstream side at a distance in the lengthwise direction. A predetermined gap is formed between the head of the support pin 46 and the vertical surface on the upstream side of the body portion 41.

A shutter member 50 is supported by the stay 40 disposed on the downstream side of the pair of document introduction rollers 16 of the support frame body 24 so as to freely move up and down between a shut-off position (see FIGS. 8 and 10) where the shutter member shuts off the document conveying passage 12 and the leading end of the document inserted in the document conveying passage 12 from the document insertion portion 14 comes in contact therewith so as to be positioned and an open position (see FIGS. 9 and 11) where the shutter member retracts upward from the document conveying passage 12 permitting the document to move. More specifically, the shutter member 50 is supported by the stay 40 so as to move down from the open position to the shut-off position due to its own weight and to move up from the shut-down position to the open position against its own weight.

The shutter member 50 which can be formed of a metal plate such as steel plate comprises a shutter portion 51 that extends in the vertical direction as viewed in the direction of width (i.e., in the lengthwise direction of the shutter member 50) and an upper flange 52 that extends from the upper end of the shutter portion 51 at right angles with the downstream direction, and has an L-shape as a whole. The length of the shutter member 50 in the lengthwise direction is shorter than the length of the notch 45 of the stay 40 in the lengthwise direction. Notches 53 having a predetermined width and depth are each formed at both ends in the lengthwise direction of the shutter portion 51 of the shutter member 50 from the upper end thereof toward the lower end thereof. The notches 53 having mutually substantially the same shape extend up to part of the regions near the bent portion of the upper flange 52. The lower surface in the downstream side regions of the notches 53 of the upper flange 52 defines the to-be-acted surface 52A. Elongated holes 54 having mutually substantially the same shape are formed in the shutter portion 51 at positions near both ends in the lengthwise direction and on the inside of the notches 53, so as to extend in the vertical direction. The elongated holes 54 are formed at positions in match with the support pins 46 screwed into the body portion 41 of the stay 40. The elongated holes 54 have a width slightly larger than the diameter of the support pins 46 but slightly smaller than the diameter of the head of the support pin 46. The above-mentioned predetermined gap formed between the head of the support pin 46 and the vertical surface on the upstream side of the body portion 41, is slightly larger than the thickness of the plate of the shutter portion 51. Protruded portions 57 of a plural number (or of the number of four in this embodiment) are formed on the shutter portion 51 at intervals in the lengthwise direction thereof so as to protrude downward by an equal length from the lower end surface 51a of the shutter portion 51. Of them, two protruded portions 57 are formed at both ends of the shutter portion 51. The lower end surface 51a of the shutter portion 51 is positioned substantially on the same flat surface.

Referring to FIGS. 8, 9 and 12, a lower guide plate 15 of the document conveying passage 12 is disposed at an upper end of the copier body 102 but under the guide plate 14a so as to be opposed to the guide plate 14a at a gap. Slits 15A are formed in the lower guide plate 15 formed of a metallic base plate such as a flat steel plate, the slits 15A being formed in a plural number (or in a number of four in this embodiment) at intervals in the direction of width of the document conveying passage 12. Each of the slits 15A having mutually substantially the same shape is defined by a pair of inclined portions 15a (see also FIG. 13) that are so bent as to be tilted downward in the directions to approach each other from the positions spaced apart in the direction of conveying the document. The pair of inclined portions 15a are nearly of a rectangular shape and define the slit 15A between the ends thereof so as to extend in the direction of width of the document conveying passage 12. The width of the slit 15A in the direction of conveying the document is set to be wider than the thickness of the protruded portions 57 of the shutter member 50. In the lower guide plate 15 are further defined plural openings 15B at intervals in the direction of width of the document conveying passage 12, so that top portions of the outer peripheral surfaces of the driven rollers 16a of the pairs of document introduction rollers 16 are permitted to protrude upward beyond the upper surface of the lower guide plate 15. The opening portions 15B are defined by pairs of inclined portions 15b (see also FIG. 13) formed by being so folded as to be inclined downward in the directions to approach each other from the positions spaced apart in the direction of conveying the document. The pair of the inclined portions 15b have nearly a rectangular shape and define an opening 15B between the ends thereof. In FIG. 12, symbol SW1 denotes an inserted document detector switch which is so positioned that its top portion protrudes beyond a slit 15C formed in the lower guide plate 15.

The elongated holes 54 in the shutter portion 51 of the shutter member 50 are fitted to the corresponding support pins 46 of the body portion 41 of the stay 40 to support the shutter member 50 so as to allow to move up and down relative to the stay 40. When the elongated holes 54 are each fitted to the corresponding support pins 46, the shutter member 50 moves down due to its own weight, whereby the lower end surface 51a of the shutter portion 51 is placed on the flat upper surface of the lower guide plate 15, the protruded portions 57 of the shutter portion 51 are positioned in the slits 15A of the lower guide plate 15, and the shutter member 50 is brought to the shut-off position.

The shutter portion 51 is so positioned that the protruded portions 57 protrude into the slits 15A from the upper surface of the lower guide plate 15, and the vertical surfaces of the shutter portion 51 other than those of the protruded portions 57 are positioned to extend in the direction of width to shut off the document conveying passage 12.

Acting plate members 90 which are acting protuberances for moving the shutter member 50 up and down by the turn of the cover frame 30 are disposed on the cover frame 30. In this embodiment, there are arranged a total of two acting plate members 90 each on the lower surface at both ends of the cover frame 30. Referring to FIGS. 10 to 12, the acting plate member 90 that can be molded as a unitary structure by using a suitable synthetic resin such as ABS resin is constituted by a rectangular mounting base portion 91, a rectangular stepped portion 92 extending downward at right angles from the end of the mounting base portion 91, and a rectangular acting portion 93 extending forward at right angles from the end of the stepped portion 92, each having substantially a predetermined thickness and a width. A mounting hole 91a is formed in the mounting base portion 91. Acting protuberances 93a protrude upward at both side portions at the front end on the upper surface of the acting portion 93. The upper ends of the acting protuberances 93a has arcuate surfaces as viewing the acting portion 93 from the side. Mounting portions 30A for mounting the acting plates member 90 are formed on the lower surface at both ends of the cover frame 30 at positions just upstream of the axis of the turn shaft 31. The mounting portions 30A are formed by flat lower surfaces of reinforcing ribs (not shown) formed on the lower surface of the cover frame 30 that is molded as a unitary structure by using a suitable synthetic resin such as ABS resin. The acting plate members 90 are mounted on the cover frame 30 by detachably engaging the mounting base portions 91 with the corresponding mounting portions 30A of the cover frame 30 by using screws (not shown). The ends of the acting portions 93 of the acting plate members 90 are so positioned as to protrude in the downstream direction from the downstream end of the cover frame 30. The length of the cover frame 30 in the direction of width is smaller than the length of the notch 45 of the stay 40 in the direction of width, so will not to interfere the turning motion of the cover frame 30. The to-be-acted surface 52A of the shutter member 50 is disposed on the locus of turn of the acting protuberance 93a of the acting plate member 90.

Described below is the operation of the document conveying apparatus 10 illustrated with reference to FIGS. 8 to 12. Referring to FIGS. 8 and 12, when it is attempted to copy a document, the cover frame 30 is, first, opened (brought to the open position) from the closed position shown in FIG. 9 by being turned on the turn shaft 31 in the counterclockwise direction in FIG. 9. The to-be-engaged hooks 33 of the cover frame 30 are disengaged from the corresponding engaging pins 24b due to the forced turning force. When the cover frame 30 is turned counterclockwise on the turning shaft 31 toward the open position, the acting protuberances 93a of the acting plate members 90 move downward to separate away from the to-be-acted surface 52A of the shutter member 50, permitting the shutter member 50 to move down toward the shut-off position due to its own weight. When the cover frame 30 is further turned to the open position, the acting protuberances 93a move down to separate away from the to-be-acted surface 52A of the shutter member 50, whereby the shutter member 50 further moves down due to its own weight and is brought to the shut-off position. At this occasion, the open position of the cover frame 30 is located beyond the position shown in FIG. 8 in the counterclockwise direction (not shown), and the upper surface of the cover frame 30 is stably held in a state where it comes in contact with the upper edge 24c (see FIG. 4) on the downstream side of the notch 24a of the support frame body 24 due to its own weight.

Then, the document that is not shown is manually inserted by the user into the document insertion portion 14 of the document conveying apparatus 10 through a gap between the document-placing table 134 and the upper guide plate 14a. The follower roller 16b of the pair of document introduction rollers 16 is separated upward away from the driven roller 16a, and the nip portion between the follower roller 16b and the driven roller 16a is opened. Therefore, the leading end of the document inserted in the document conveying apparatus 10 from the document insertion portion 14 passes over the upper end region of the outer peripheral surface of the driven roller 16a of the pair of document introduction rollers 16 and moves in the downstream direction. The leading end of the document is brought into contact with the vertical surface on the upstream side of the shutter portion 51 of the shutter member 50 that has been brought to the shut-off position, and is blocked from moving in the downstream direction and is positioned in the direction of conveying the document. And at this moment, the leading end of the document is positioned to be at right angles with the direction of conveying the document due to the vertical surface on the upstream side of the shutter portion 51 of the shutter member 50. The manual operation for positioning the leading end of the document to be at right angles with the direction of conveyance can be carried out by simply bringing the end of the document into contact with the vertical surface on the upstream side of the shutter portion 51 of the shutter member 50 that is positioned at right angles with the direction of conveying the document. Therefore, the operation is very simple and the leading end is correctly positioned, compared with the manual operation of inserting the leading end of the document in the nip portion of the pair of document introduction rollers 16 required by the conventional device. The above-mentioned operation effect is similarly accomplished even when the document has a large size, e.g., has a JIS A0-size. When the leading end of the document is inserted in the document insertion portion 14, the inserted document detector switch SW1 is turned on.

Referring next to FIGS. 9 and 11, after the end of the document is positioned to be at right angles with the direction of conveying the document by the vertical surface on the upstream side of the shutter portion 51 of the shutter member 50 as described above, the cover frame 30 is closed (brought to the closed position) from the open position that is not shown, by being turned clockwise on the turn shaft 31 in FIG. 8. The to-be-engaged hooks 33 of the cover frame 30 are brought into resilient engagement with the lower side of the corresponding engaging pins 24b, and the cover frame 30 is stably held at the closed position. When the cover frame 30 is turned clockwise on the turn shaft 31 toward the closed position, the acting protuberances 93 of the acting plate members 90 are bought into contact with the to-be-acted surface 52A of the shutter portion 50 from the lower side, and cause the shutter member 50 to move up to the open position against its own weight. When the cover frame 30 is further turned to the closed position, the acting protuberances 93a further cause the to-be-acted surfaces 52A of the shutter member 50 to be further moved up to bring the shutter member 50 to the open position. The protruded portions 57 of the shutter member 50 protrude upward through the slits 15A of the lower guide plate 15 and are positioned above the upper surface of the lower guide plate 15 at intervals. Since the follower roller 16b of the pair of document introduction rollers 16 is brought into pressed contact with the driven roller 16a via the leading end of the document that is inserted, the leading end of the document is nipped by the driven roller 16a and the follower roller 16b constituting the pair of document introduction rollers 16. When the cover frame 30 is brought to the closed position, the open/close position detector sensor S1 (see FIG. 4) is turned off.

As described above, when the leading end of the document is inserted in the document insertion portion 14 and the cover frame 30 is brought to the closed position, the control means 80 (see FIG. 7) receives a detection signal (ON-signal) from the inserted document detector switch SW1 and a detection signal (OFF-signal) from the open/close position detector sensor S1, energizes the electromagnetic clutch CL after a lapse of a predetermined period of time and rotatively drives the electric motor M. Then, the pair of document introduction rollers, the document holder roller 20 and the pair of discharge rollers 22 are rotated. The document nipped by the pair of document introduction rollers 16 is conveyed in the downstream direction along the document conveying passage 12 and is, then, conveyed in cooperation with the document holder roller 20 and the pair of discharge rollers 22. At the time when the document passes over the glass 70 at the image-reading position, it is brought into close-contact with the upper horizontal surface of the glass 70 by the document holder roller 20, whereby correct reading of the image is guaranteed. At the start of conveyance of the document, the leading end of the document has been nipped by the pair of document introduction rollers 16 in a state of being correctly positioned to be at right angles with the direction of conveyance due to the vertical surface on the upstream side of the shutter portion 51 of the shutter member 50. Even at a moment when the pair of document introduction rollers 16 are rotated, therefore, the document is reliably prevented from being arranged aslant and is conveyed in the direction of conveyance while maintaining a correct position. Namely, the document is reliably prevented from being fed aslant and is, further, reliably prevented from being damaged.

When the trailing end of the document passes over the inserted document detector switch SW1 and the inserted document detector switch SW1 is turned off, the control means 80 de-energizes the electromagnetic clutch CL to discontinue the rotation of the driven roller 16a of the pair of document introduction rollers 16. The pair of document introduction rollers 16 cease to rotate. Further, after a lapse of a predetermined period of time from when the trailing end of the document has passed over the inserted document detector switch SW1 and the inserted document detector switch SW1 is turned off, i.e., when it is judged by the control means 80 that the trailing end of the document has passed through the pair of discharge rollers 22 and the document is completely discharged out of the document conveying apparatus 10, the operation of the electric motor M is brought into a halt. Thereby, the pair of discharge rollers 22 and the document holder roller 20 cease to rotate. The image of the document conveyed by the document conveying apparatus 10 in the above-described way is read by the close-contact type image sensor 104 as it passes through the image-reading position disposed on the way of the document conveying passage 12. The image read by the close-contact type image sensor 104 is turned into a toner image through the image-forming portion 106. The toner image is transferred and fixed onto the paper conveyed from the paper-holding portion 120 thereby to copy the document. The above copying operation is as described earlier and its details are not described here again.

Figure 13:
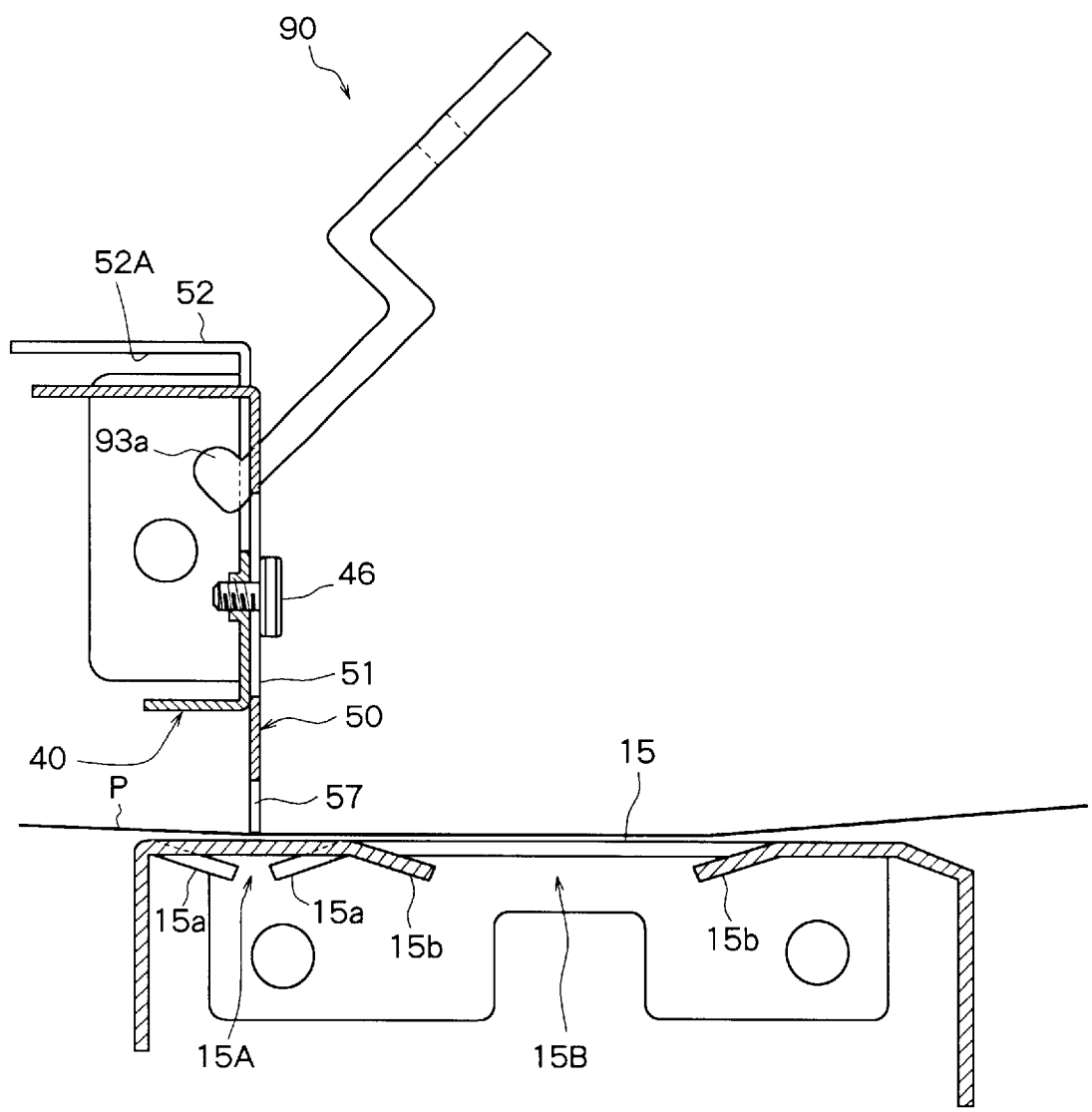
FIG. 13 is a schematic sectional view illustrating, on an enlarged scale, a major portion of the document conveying apparatus shown in FIG. 8 and illustrating another mode of operation.

In case there occurs a jamming while the document to be copied is being conveyed through the copier 100 equipped with the document conveying apparatus 10 described above with reference to FIGS. 8 to 12, the operation for conveying the document is brought into a halt in a state where the document is left on the conveyer passage 12. When the cover frame 30 is turned from the closed position to the open position in this state, the acting plate members 90 of the cover frame 30 are moved downward in a direction to separate away from the corresponding to-be-acted surface 52A of the shutter member 50 permitting the shutter member 50 to move down to the shut-off position due to its own weight. As shown in FIG. 13, the lower ends of the protruded portions 57 which are the lower ends of the shutter member 50 come into contact with the upper surface of the document P left on the conveyer passage 12 and are prevented from moving down any more. Here, as described above, the shutter member 50 moves down due to its own weight and hence, does not exert an excess of load to the document P even when it comes into contact with the upper surface of the document P left on the conveyer passage 12. Accordingly, even when the cover frame 30 is turned from the closed position to the open position in a state where the document P is left on the conveyer passage 12, the document P is not damaged. In the document conveying apparatus 10 described above with reference to FIGS. 2 to 7, when the cover frame 30 is brought to the open position, the shutter member 50 is brought to the shut-off position by the action of the leaf spring members 60 against the resilient force of the compression coil springs 56. If the resilient forces of the compression coil springs 56 and the leaf spring members 60 are too strong, therefore, the document P may be damaged when the cover frame 30 is turned from the closed position to the open position in a state where the document P is left on the document conveying passage 12. In the above-mentioned document conveying apparatus 10 described with reference to FIGS. 2 to 7, therefore, attention must be given to setting the resilient forces.

In the document conveying apparatus 10 described above with reference to FIGS. 8 to 13, four slits 15A are formed in the lower guide plate 5 at intervals in the direction of width of the document conveying passage 12. Each slit 15A is defined by a pair of inclined portions 15a that are formed by being so bent as to be tilted downward in a direction to approach each other from the positions spaced apart in the direction of conveying the document. Therefore, at the time when the leading end of the document is brought into contact with the vertical surface of the shutter member 50 in a state where the shutter member 50 is brought to the shut-off position or when the document that is set starts to be conveyed as the shutter member 50 is moved up from the shut-off position to the open position, the leading end of the document, though the end being curled downward, does not enter into the slits 15A and hence, a smooth conveyance is guaranteed. As will be obvious from the foregoing description, the copier 100 equipped with the document conveying apparatus 10 explained with reference to FIGS. 8 to 13 guarantees smooth execution of the image recording and a high image-forming efficiency, like the copier 100 equipped with the document conveying apparatus 10 described earlier with reference to FIGS. 2 to 7.

The invention was described above in detail by way of embodiments with reference to the accompanying drawings. It should, however, be noted that the invention is in no way limited to the above-mentioned embodiments only but can be varied or modified in a variety of other ways without departing from the scope of the invention. For example, in the document conveying apparatus 10 described above with reference to FIGS. 8 to 13, the shutter member 50 is formed of a metal plate such as a steel plate. The shutter member 50, however, may be constituted by a suitable plate member such as of a synthetic resin.

What I claim is:

1. A document conveying apparatus, comprising a document conveying passage and a pair of document introduction rollers disposed at a document insertion portion on said document conveying passage, wherein:

said document conveying apparatus further comprises a support frame body disposed on the upper side of said document conveying passage and a cover frame supported pivotably by said support frame body;

said pair of document introduction rollers are constituted by a driven roller disposed on the lower side of said document conveying passage and a follower roller supported by said cover frame, said cover frame is allowed to turn selectively between a closed position where said follower roller is brought into pressed contact with said driven roller and an open position where said follower roller is located at an upper position away from said driven roller, a shutter member is supported on the downstream side of said pair of document introduction rollers to freely move up and down between a shut-off position where said shutter member shuts off said document conveying passage so that the leading end of a document inserted in said document conveying passage from said document insertion portion comes in contact therewith and is positioned and an open position where said shutter member retracts upward from said document conveying passage to permit the movement of said document, and said cover frame and said shutter member are interlocked to each other so that said shutter member is moved up to said open position when said cover frame is turned to the closed position and so that said shutter member is moved down to said shut-off position when said cover frame is turned to the open position; and wherein a cam means capable of moving up and down said shutter member is disposed in said cover frame, an elastic member is disposed between said support frame body and said shutter member to urge said shutter member toward the open position and when said cover frame is brought to said open position, said shutter member is brought to the shut-off position by the action of said cam means against the resilient member and when said cover frame is brought to the closed position, said shutter member is brought to the open position by said elastic member as it is no longer acted upon by said cam means.

2. A document conveying apparatus according to claim 1, wherein said cam means is constituted by a leaf spring member having an arcuate cam surface, said shutter member has a to-be-depressed surface formed thereon, when said cover frame is turned to the open position, the cam surface of said leaf spring member is brought to an acting position where it depresses the to-be-depressed surface of said shutter member to move said shutter member down to the shut-off position against the elastic member and, when the cover frame is turned to the closed position, the cam surface of said leaf spring member is brought to a non-acting position where it substantially releases a depressing pressure of the to-be-depressed surface to said shutter member, permitting said shutter member to move up to the open position by said elastic member.

3. A document conveying apparatus according to claim 2, wherein said cover frame is rotatably supported by the support frame body via a turn shaft and, when said cover frame is turned to the open position, said leaf spring member brought to the acting position forcibly turns said cover member on the turn shaft to hold it at the open position.

4. A document conveying apparatus according to claim 1, wherein provision is made of an inserted document detector means disposed in the document insertion portion to detect the document that is inserted, an open/close position detector means disposed in the support frame body to detect the open position and the closed position of the cover frame, and a control means which, when the document is inserted in the document insertion portion and the cover frame is brought to the closed position, rotatively drives the pair of document introduction rollers in response to detection signals from said inserted document detector means and said open/close position detector means.

5. An image-forming machine equipped with a document conveying apparatus of claim 1, for reading the image of a document conveyed by said document conveying apparatus and recording it onto a paper.

6. A document conveying apparatus, comprising a document conveying passage and a pair of document introduction rollers disposed at a document insertion portion on said document conveying passage, wherein:

said document conveying apparatus further comprises a support frame body disposed on the upper side of said document conveying passage and a cover frame supported pivotably by said support frame body;

said pair of document introduction rollers are constituted by a driven roller disposed on the lower side of said document conveying passage and a follower roller supported by said cover frame, said cover frame is allowed to turn selectively between a closed position where said follower roller is brought into pressed contact with said driven roller and an open position where said follower roller is located at an upper position away from said driven roller, a shutter member is supported on the downstream side of said pair of document introduction rollers to freely move up and down between a shut-off position where said shutter member shuts off said document conveying passage so that the leading end of a document inserted in said document conveying passage from said document insertion portion comes in contact therewith and is positioned and an open position where said shutter member retracts upward from said document conveying passage to permit the movement of said document, and said cover frame and said shutter member are interlocked to each other so that said shutter member is moved up to said open position when said cover frame is turned to the closed position and so that said shutter member is moved down to said shut-off position when said cover frame is turned to the open position; and wherein said shutter member is supported by said support frame body so as to be moved down to the shut-off position from the open position due to its own weight and to be moved up to the open position from the shut-off position against its own weight, an acting protuberance is disposed on said cover frame to move said shutter member up and down with the turn of said cover frame, a to-be-acted surface is formed on said shutter member, said to-be-acted surface of said shutter member is disposed on a locus of turn of the acting protuberance of said cover frame and when said cover frame is turned to the closed position, said acting protuberance is brought into contact with said to-be-acted surface of said shutter member from the lower side to move said shutter member up to the open position against its own weight and when said cover frame is turned to the open position, said acting protuberance moves in a direction to separate away downwardly from the to-be-acted surface of said shutter member, permitting said shutter member to move down to the shut-off position due to its own weight.

* * * * *